Aug. 7, 1962    S. HANSEN    3,048,352
AUTOMATIC CELESTIAL NAVIGATION AND GUIDANCE SYSTEM
Filed Jan. 4, 1954    4 Sheets-Sheet 1
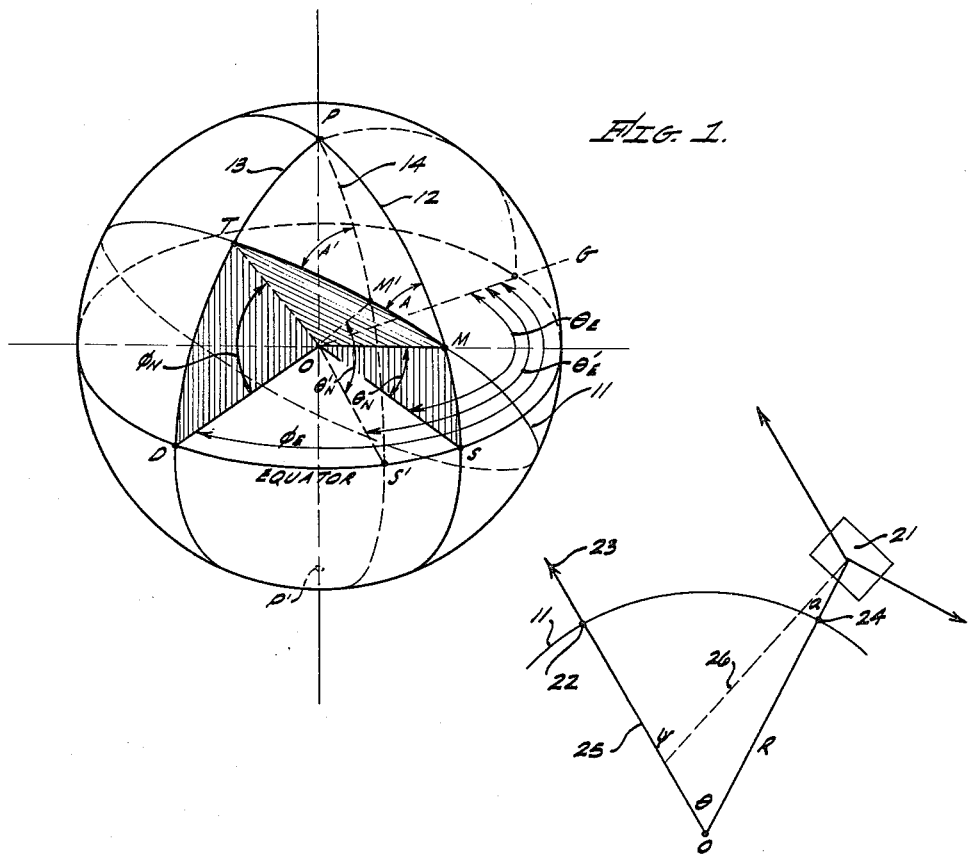
FIG. 1.
FIG. 2.
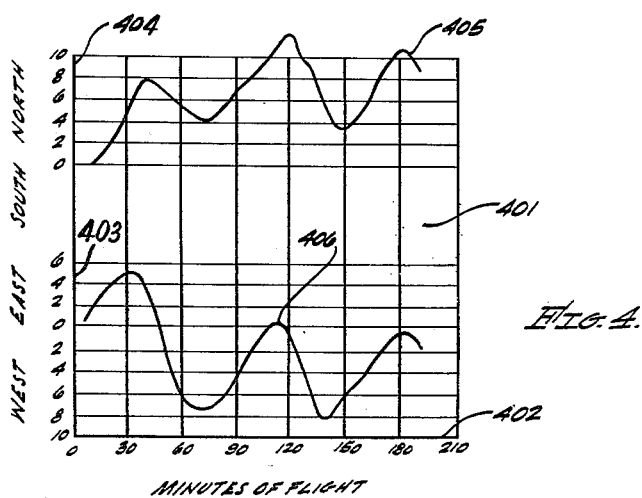
FIG. 4.
INVENTOR.
SIEGFRIED HANSEN
BY Nicholas T Vohs
HIS ATTORNEY.

Aug. 7, 1962  S. HANSEN  3,048,352
AUTOMATIC CELESTIAL NAVIGATION AND GUIDANCE SYSTEM
Filed Jan. 4, 1954  4 Sheets-Sheet 2
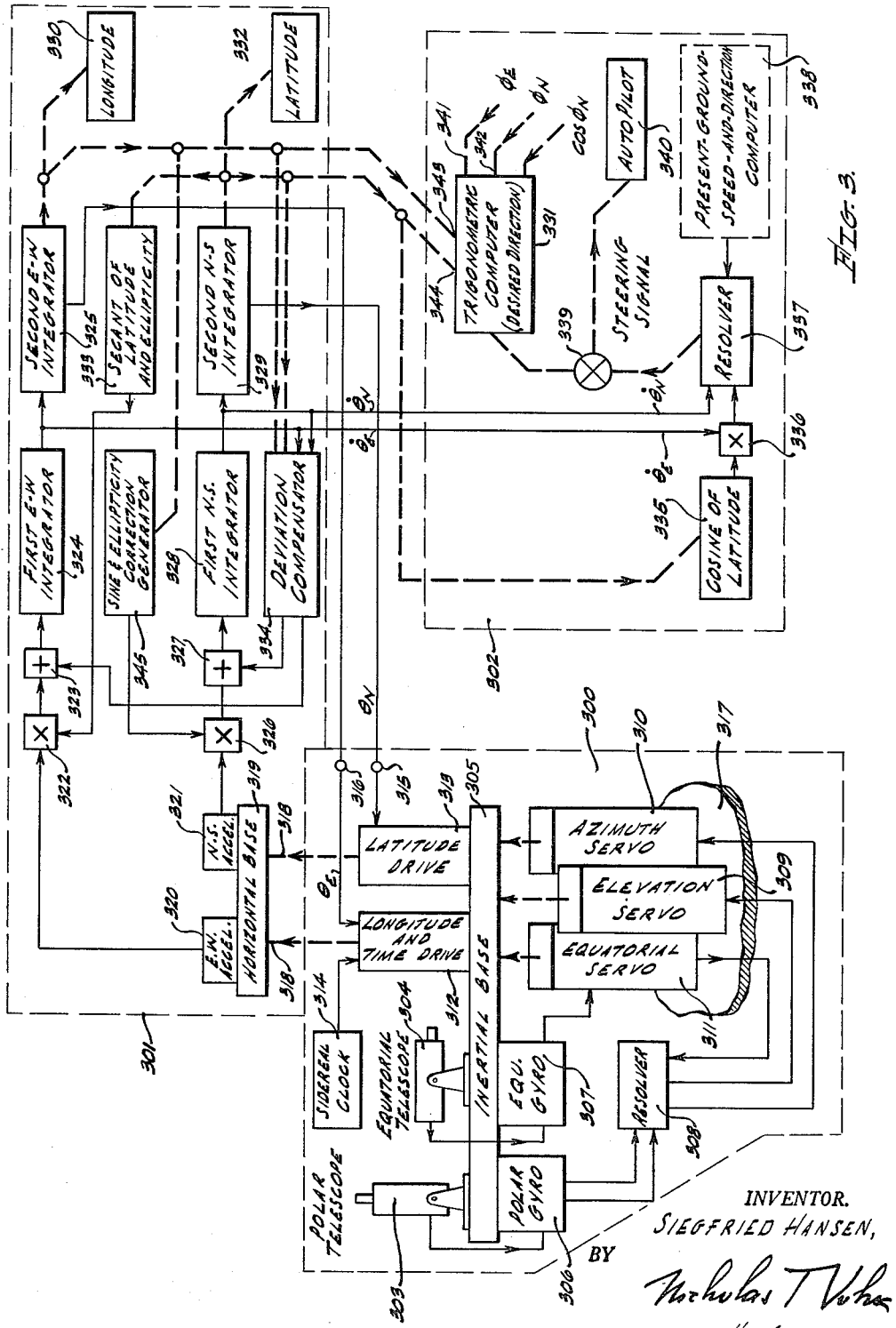
INVENTOR.
SIEGFRIED HANSEN,
BY
Nicholas T. Voles
HIS ATTORNEY.

Aug. 7, 1962 S. HANSEN 3,048,352
AUTOMATIC CELESTIAL NAVIGATION AND GUIDANCE SYSTEM
Filed Jan. 4, 1954 4 Sheets-Sheet 3

INVENTOR.
SIEGFRIED HANSEN,
BY Nicholas T Volk
HIS ATTORNEY.

Aug. 7, 1962  S. HANSEN  3,048,352
AUTOMATIC CELESTIAL NAVIGATION AND GUIDANCE SYSTEM
Filed Jan. 4, 1954  4 Sheets-Sheet 4

INVENTOR.
SIEGFRIED HANSEN,
BY Nicholas T Vohm
HIS ATTORNEY.

United States Patent Office 3,048,352
Patented Aug. 7, 1962

3,048,352
AUTOMATIC CELESTIAL NAVIGATION AND GUIDANCE SYSTEM
Siegfried Hansen, Los Angeles, Calif., assignor, by mesne assignments, to Hughes Aircraft Company, a corporation of Delaware
Filed Jan. 4, 1954, Ser. No. 402,187
18 Claims. (Cl. 244—14)

This invention relates to automatic celestial navigation systems for the guidance of airborne craft and, in particular, to a method and means of automatically and accurately guiding a high speed aircraft unattended from one terrestrial location to another.

As long range aircraft and airborne missiles achieve higher speeds of travel, the in-flight determination of present terrestrial position, and setting of a course to a terrestrial target position, must be accomplished more rapidly than is humanly possible. The rapid change in present position and required course direction to a destination can best be determined by electronic means cooperating with automatic controls.

The guidance of craft over the earth's surface requires, first, that the present position of the craft be determined with respect to a fixed reference in the earth. Secondly, the comparison of the earth reference position and the craft's position is used to obtain the distance and direction remaining to the destination. The principles of determining such reference information have long been known to navigators. For comparatively slow moving vehicles navigational measurement and computation can be made readily. But, where high speeds of modern aircraft are involved, one means of making these measurements, computations, and flight control may employ an automatic dynamic navigation and guidance system referenced against the positions of fixed stars. Such a dynamic guidance system must be self-contained in the aircraft. It must also operate unattended after having been set up.

The dynamic system for automatic navigation and guidance of an aircraft is based upon the use of a star-tracking mechanism including a sidereal clock, as reference, to provide a space-stabilized base with reference to predetermined fixed stars and to provide control signals for establishing a horizontal base for accelerometers which provide outputs representative of the present position in latitude and longitude coordinates. In cooperation with the space-stabilized base and the horizontal base, a vertical line, with respect to the aircraft's present position on earth, is established by operation of the accelerometer device, which may be a pendulum accelerometer and which may also, in cooperation with the remainder of the system, provide outputs representative of horizontal accelerations in E—W and N—S directions that have been corrected for earth motions as hereinafter described. The automatic star tracker, by reference to the directions of fixed celestial bodies, provides reference lines parallel with the earth's polar axis and equatorial plane, respectively. Servomechanisms, responding to error signals derived from the double integration of the corrected accelerometer outputs, are utilized to control a horizontal base for the accelerometers. The horizontal base is maintained perpendicular to the vertical line passing through the instantaneous present position on the surface of the earth. The vertical line corresponds to the direction of a plumb line. The line establishes the zenith direction from the present position. Correction signals to compensate for centrifugal and coriolis forces resulting from the earth's rotation are generated to correct the accelerometer outputs. The corrected accelerometer outputs are integrated twice and applied to servomechanisms operating the horizontal base. After the equipment has been set up for a starting point, the angle between the vertical line thereby established and the equatorial plane gives a present North latitude position. After the equipment has been set up for a starting point, the angular rotation in the equatorial plane, referred to a side-real timing device, gives a present longitude position.

In addition to the "present-position" computing devices, including the star tractor and accelerometer longitude and latitude computer, an automatic celestial navigation and guidance system must include a course-determining computer and a means coupled with an automatic pilot to adjust the aircraft control surfaces in accordance with error signals from the course-determining computer to correct the aircraft's flight course in the event of deviation from the computed course.

In the prior art some of the above-enumerated principles have been carried out with star trackers in cooperation with electromechanical linkages operated by preset clock motors where indication of present position was the major desired end result. Other systems have applied generally similar mechanical linkages to the determination and indication of geographical position. The possibility of such mechanical systems being tied into an automatic pilot have been disclosed.

In the present invention means are provided not only to determine present position but to compute a course from the present position to a destination and to automatically guide the aircraft from the present position to the destination position along the computed course. A present-position computer is employed incorporating an automatic star-tracking mechanism, accelerometers, and double electronic integrators operating upon the corrected accelerometer output signals. The present-position computer output signals provide direct indication of latitude and longitude derived by the double integration of the corrected accelerometer outputs, one accelerometer indicating N—S accelerations, one indicating E—W accelerations. The accelerometers are mounted on the horizontal base which, as has been pointed out above, is maintained in its position by the stellar reference servomechanisms of the star tracker. Signals representative of variations in the flight attitude of the airframe are applied to the star-tracking mechanism along with error signals developed in the tracking operation to keep the telescopes of the star tracker pointing at predetermined fixed stars.

Predetermined correction factors for centrifugal and coriolis forces are generated in a portion of the present-position computer. These are combined with the accelerometer output signals along with elliptical correction factors for earth shape to give true latitude and longitude indication in terms of actual shaft rotations, the shaft rotations indicating the elapsed earth co-ordinate angles. The automatic celestial navigation and guidance system of this invention also includes a navigation computer that receives the latitude-longitude output information of the present-position computer along with preset information corresponding to the latitude and longitude of the destination or target position as a rotational shaft position. The instantaneous present position, the fixed destination position, and the geographical center of the earth form the apices of a spherical triangle. The spherical side of this triangle (the course from present position to destination) is continuously being solved by the navigation computer in terms of true course bearing (distance and direction) to the destination. The true course bearing is the angle the course makes with true north or a meridian circle. The distance is computed as a function of angular rotation about the center of the earth. Any deviation of the flight direction from the true bearing results in error signals that are impressed on an automatic piloting means in the airframe to bring the aircraft, or missile, back on course. Additionally the system may include a navigation computer capable of directing the craft to a second destination after the first has been reached.

Accordingly, it is an object of this invention to provide an improved automatic celestial navigation and guidance system for high speed airborne craft, to be self-contained within the craft and to direct the craft to a predetermined destination without human agency after having been once set up.

It is a further object of this invention to provide an automatic celestial navigation and guidance system comprising an improved star-stabilized present-position computer, a navigation computer, and automatic flight control deriving control signals from the said present-position computer and said navigation computer.

It is another object of this invention to provide an automatic celestial navigation and guidance system in which all computing and indicating of present position or target position is done in the conventional angular dimensions of the earth's latitude and longitude co-ordinate system.

It is still another object of this invention to provide in an automatic celestial navigation and guidance system an improved star-stabilized base which is oriented parallel to the earth's equatorial plane and an accelerometer base which is levelled by a position feedback from the output of the present-position computer.

An additional object of this invention is to provide in an automatic celestial navigation and guidance system means for computing present position by the double integration of corrected accelerometer output signals.

Another object of this invention is to provide in an automatic celestial navigation and guidance system electronic means for deriving steering information for guidance in which comparison is made of the present position and target position signals.

A still further object of this invention is to provide an automatic celestial navigation and guidance system capable of guiding an aircraft first to one destination and from the first destination to a second destination.

The novel features which are believed to be characteristic of this invention, both as to its organization and method of operation, together with further objects and advantages thereof, will be better understood from the following description considered in connection with the acompanying drawings, and its scope is pointed out in the appended claims.

In the drawings:

FIG. 1 is a perspective drawing of the terrestrial sphere showing the great circle course that an aircraft may follow over are earth under the guidance of the automatic celestial navigation and guidance system;

FIG. 2 is a two-dimensional representation of the flight path over the earth to illustrate the operation of one of the accelerometers;

FIG. 3 is a block diagram of the automatic celestial navigation and guidance system;

FIG. 4 illustrates the 84 minute oscillation error condition considered with respect to FIG. 2;

Figure 5:
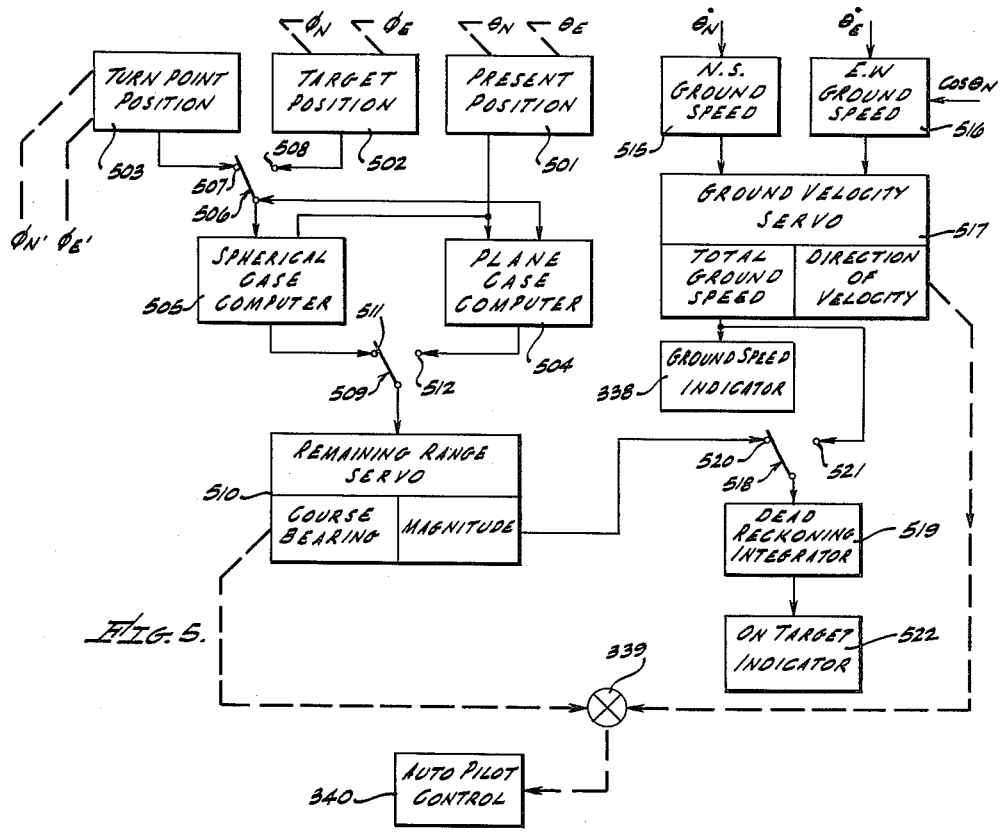
FIG. 5 is a block diagram of the navigation computer of the automatic celestial navigation system.

In order to more clearly set forth the navigation problem to be solved by the celestial guidance system of this invention, the terrestrial sphere shown in FIG. 1 has been drawn to illustrate the spherical geometry of a great circle course 11, which must be flown by a missile or aircraft, in which the automatic guidance system is installed.

In the terrestrial sphere of FIG. 1, P—P' is the polar axis passing through the center of the sphere at O. The North Pole is at P, and the South Pole at P'. The Equator is in a plane with O. Longitude measurements are made from the meridian of Greenwich (arc P—G) along the Equator rotating in the equatorial plane about the polar axis. The West longitude of the craft instantaneous position, M, is shown by arrow arc $\theta_E$ and is the angle GOS. The longitude of the destination position, T, is shown by arrow arc $\phi_E$ and is the angle GOD. An intermediate position, M', where the course crosses meridian 14, has a longitude measured by angle GOS'. Measurement of latitude is made along a meridian arc such as 12 or 13 between the Equator and a pole. The North latitude of the target position T is shown by $\phi_N$ and is the angle TOD. The instantaneous North latitude position of the craft M is shown by $\theta_N$ and is the angle MOS. The great circle course which the craft must follow from its present or instantaneous position to the target position is the arc M—T on the great circle 11.

The angle A represents the true bearing of the course to the target and is the angle that the line of the desired course M—T on the programmed course great circle 11 makes with the meridian circle 12 of the present position passing through P—M—S.

The triangle MOT, having a spherical side M—T, is the course triangle which must be solved continuously. Triangle MOT includes the target point vertical OT and the present-position vertical OM. The side M—T of the programmed course triangle is also part of another spherical triangle, TMP. The angle TMP, corresponding to true bearing angle A, will change as the craft approaches the destination. The dashed meridian line 14, passing through M'P, illustrates this condition, forming the wider angle TM'P with the programmed course on great circle 11. The change in true bearing angle A to A' is another condition which must be continually monitored and computed.

Now, considering that the destination point T on the terrestrial sphere, having a latitude $\phi_N$ and a longitude $\phi_E$ must be reached from present position M, having a latitude $\theta_N$ and longitude $\theta_E$, the shortest path from M to T is a great circle course 11 around the sphere. The geocentric co-ordinates of the destination position T are fixed. One of the functions of the equipment of this invention is to determine the present position M and any new present position M' on the course to T. The determination is made by what is called the present-position computer which is shown in dashed blocks 301 and 300 of FIG. 3, to be considered below.

The basic principle of the celestial navigation and guidance system of this invention is best explained with reference to the simplified two-dimensional drawing of FIG. 2. For the discussion of this figure, it is assumed that the guided craft has aboard star-tracking means such as dashed block 300 of FIG. 3, considered later, and an accelerometer 21; the craft follows a great circle course 11 on the surface of a spherical, non-rotating earth; a convenient guide star is directly overhead at the starting point 22 in the direction of the arrow 23. The problem is to determine the present position 24 of the craft along the course 11 by measurements which are made on board the craft.

By using the available guide star to advantage with a photoelectric or other star-tracking mechanism to control and stabilize a platform to maintain a fixed orientation in space and by mounting an electrical accelerometer, such as represented by box 21, with respect to this star-stabilized platform, so as to be exactly horizontal (i.e., tangent to the earth's surface), the electrical output of the accelerometer may be doubly integrated to provide a signal directly proportional to elapsed distance. To remain horizontal the accelerometer must turn with respect to the star-stabilized platform by an angle proportional to the elapsed distance as the guided craft moves over the curved surface of the earth along the course 11. Since the second integration yields a signal proportional to the required rotation, this signal may be applied to a positioning servo system to effect the rotation and control it.

Referring again to FIG. 2, the guided craft is started from point 22. The arrow 23 points in the direction of a selected guide star. The craft has traveled a total angular distance $\theta$, the angle $\theta$ rotating about the center of the earth.

Assume the accelerometer 21 is misaligned from its true horizontal by a small angle $\alpha$. The total output signal $a$, from the accelerometer may be represented by the relationship:

$$a = R\theta - g\alpha$$

where $R\theta$ is the horizontal acceleration being measured and $g\alpha$ is the gravity component coupled in as a result of the misalignment.

The angle $\psi$ between the star line 25 and the accelerometer axis 26 is determined by the output signal at the second integration and, therefore, is proportional to the second integral of the accelerometer output:

$$\psi = \int_0^t \int_0^t \frac{a}{R} dt\, dt$$

By introducing a constant $$\frac{1}{R}$$

where R is the dimension of the earth's radius plus the altitude of the craft, tangential acceleration $R\theta$ is converted to angular acceleration about the earth's center. The error $\alpha$ will oscillate sinusoidally about zero at a constant amplitude and at a period $$2\pi \sqrt{\frac{R}{g}}$$

equal to 84 minutes.

FIG. 4 is an illustrative chart of the 84 minute oscillation of error referred to above. The chart of FIG. 4 is the plot of observations made on an actual flight employing the automatic celestial navigation system of this invention.

In the chart 401, the abscissa 402 is calibrated in minutes of flight. Along the ordinate, the E—W error 403 is plotted in arbitrary units and also the North error 404 in arbitrary units. The North error oscillation with time of flight is plotted at 405 and the E—W error oscillation is plotted at 406. In the example shown, at no time did the error occur South of the desired position.

The second integral of the acceleration $\psi$ will differ from the value $\theta$ by the error $\alpha$ which can be made negligibly small because the peak amplitude of the error is determined by the accuracy of the initial value set into the first and second integrators and does not increase during flight. The error, in fact, varies from its fixed maximum value to a minimum value and back to a maximum value again in 94 minutes.

The actual earth is, however, not two-dimensional and non-rotating as has been assumed for the purposes of discussion of FIG. 2. The rotation of the earth, with respect to the fixed stars, is at a uniform velocity. The earth is actually an oblate spheroid requiring computation correction factors for the amount by which the true shape differs from the spherical form on which the computations are based. The position computer of the automatic celestial navigation system of this invention, in principle, however, differs little from the system outlined in the two-dimensional example.

The entire automatic celestial navigation system for operation over the actual earth is shown in block diagram form in FIG. 3, to which reference is now made. The dashed block 300 encloses the star-tracking mechanism. The dashed block 301 encloses the present latitude and longitude computer. The combined blocks 300 and 301 may be called a stellar-referenced present-position computer. The dashed block 302 encloses the elements of the navigation computer and steering control.

Referring to dashed block 300, the star-tracking mechanism includes a polar telescope 303, and an equatorial telescope 304, both mounted in an inertial base 305. The telescopes may be pointed at selected guide stars both during day and night time despite variations in flight attitude of the airframe. This is accomplished through the operation of the polar gyro 306 and equatorial gyro 307 in conjunction with resolver 308, elevation servo 309, azimuth servo 310, and equatorial servo 311. These act upon the inertial base 305 to stabilize longitude and time drive 312 and latitude drive 313. Sidereal clock mechanism 314 is coupled to the longitude and time drive 312 to control its motion in accordance with sidereal (star) time.

The operation of star-tracking mechanisms, such as may be employed by the system of this invention, is more fully described in pending applications for U.S. patent Serial No. 771,762, filed September 2, 1947 for the invention of S. Hansen, entitled "Star Tracking System," now U.S. Patent No. 2,981,843 and Serial No. 204,613, filed January 5, 1951 for the invention of H. Hulett, entitled "Star Tracking System." Both of the above-mentioned applications are assigned to the assignee of the present application. Improved control circuitry for the servo systems employed in the present invention may be of the type disclosed in application for U.S. patent Serial No. 107,558, filed July 29, 1949 for the invention of T. E. Woodruff, entitled "Electrical Servo System" and now U.S. Patent No. 2,701,328, also assigned to the assignee of the present application. For the operation of photoelectric devices in the star-tracking mechanism to provide effectiveness during daytime operation, reference is made to the applications for U.S. patents for the inventions of S. Hansen, Serial No. 188,401, filed October 4, 1950, entitled "Electro-Optical Astrometrical System," Serial No. 58,657, filed November 6, 1948, entitled "Astrometrical Means and Method" and now U.S. Patent No. 2,941,080. The star-tracking mechanism 300 receives input signals, as at 315 and 316, from the present-latitude-and-longitude computer 301 to correct the latitude and longitude drive mechanisms 313 and 312, respectively, as necessary, in response to varying flight conditions. Another input signal to the star-tracker 300 is generated by the positioning of airframe base identified by reference character 317 which provides signals corresponding to flight-attitude variations of the airframe for use by the servo and drive mechanisms of the star-tracker 300 in its stabilization function. The star-tracker 300 provides, as at 318, output signals which are applied to and maintain the horizontal base 319 in the required horizontal position for the accelerometers 320 and 321 mounted upon the base 319. The accelerometers 320 and 321 and base 319, upon which they are mounted, are part of the present-latitude-and longitude computer 301. Output signals from E—W accelerometer 320 are applied successively through a multiplier 322 and an adder 323 to a first E—W integrator 324 and a second E—W integrator 326. Output signals from the N—S accelerometer 321 are applied through a multiplier 326 and an adder 327, successively, to a first N—S integrator 328 and a second N—S integrator 329. The integrators 324, 325, 328, and 329 may be of the type disclosed in pending application for U.S. patent, Serial No. 320,311, filed November 13, 1952 for the invention of T. E. Woodruff, entitled "D.-C. Electronic Integrating System," also assigned to the assignee of the present application and now U.S. Patent No. 2,717,310.

The output of second E—W integrator 325 is applied to a longitude indicator 330, to a trigonometric computer 331 within navigation computer 302, to a deviation compensator 334, and to longitude and time drive 312. The output of second N—S integrator 329 is applied to a longitude indicator 30, to trigonometric computer 331, to a secant-of-latitude and ellipticity-function generator 333; to a sine and ellipticity-correction generator 345, to a deviation compensator 334, to latitude drive 313 in the star-tracker 300, and to a cosine-of-latitude generator 335.

An output of first E—W integrator 324, in addition to its application to second E—W integrator 325, is applied to deviation compensator 334 and to a multiplier 336 in navigation computer 302. An output from first N—S integrator 328, in addition to its application to second N—S integrator 329, is applied to deviation compensator 334 and to a resolver 337 in navigation compter 302. An output of cosine-of-latitude generator 335 is applied through multiplier 336 to resolver 337.

The navigation computer of block 302 includes trigonometric computer 331, present-ground-speed-and-direction computer, shown in dashed block 338, cosine-of-latitude generator 335, the output of which is applied through multiplier 336 to resolver 337 along with the output of present-ground-speed-and-direction computer 338. The output of resolver 337 together with an output of trigonometric computer 331, which provides a signal corresponding to desired direction, are applied to a difference computer 339. The output of the difference computer 339 is a steering signal which is applied to autopilot 340. Trigonometric computer 331 has two inputs which are derived from devices providing target longitude signals 341 and target latitude signals 342, respectively.

In order to fully understand the operation of the automatic celestial navigation system, as illustrated in the block diagram of FIG. 3, the system must be considered as containing two operating equipment groups. These are the present-position computer, generally shown by the dashed blocks 300 and 301, and the navigation computer, generally shown by the dashed block 302. The present-position computer develops output information in the form of shaft rotations appearing at 343 and 344 representing the present longitude ($\theta_E$) and latitude ($\theta_N$) of an aircraft, or missile, in flight. The navigation computer, in response to latitude and longitude signals derived from rotation of the output shafts of the present-position computer and utilizing preset-information signals derived from shaft rotations corresponding to the longitude ($\phi_E$) and latitude ($\phi_N$) and the cosine of target latitude (cos $\phi_N$) of a destination position, develops signals which are applied to an autopilot 340 for steering the aircraft or missile in a direction towards the destination position and which also continuously compares the computed course to the destination with the course which the aircraft is presently taking to the destination to provide a correct steering signal to the autopilot 340, if necessary, and to recompute a new course if required. Thus, when the automatic celestial navigation system of this invention is installed in the craft and the appropriate settings are made at some point of origin corresponding to the starting point latitude and longitude, and also settings are made corresponding to the latitude and longitude of a destination point, the craft will accurately be directed towards that destination at any ground speed that such craft may now attain. Additionally, as will hereinafter be more fully described, the automatic celestial navigation system is provided with circuit features that make it possible to direct the craft to some point on the way to a target either by automatic programming means in the craft or by in-flight adjustment by operators of the craft, if aboard, whereby the craft may be turned by the appropriate signals and directed to another destination point. In this way, a target destination may be arrived at from a predetermined direction other than the great circle course direction between the point of origin and the target. The automatic celestial navigation system is capable of being set for two or more courses following sequentially.

The present-position computer requires a space-stabilized platform for its operation. The space stabilization of the platform is accomplished through the operation of star-tracking mechanisms as included in block 300 in stellar-referenced inertial base, as at 305, which provide stellar-reference lines, so to speak, upon which a stable platform may be maintained or referenced for essential computations as further described below. Telescopes 303 and 304 mounted on the inertial stellar base 305 are photoelectrically responsive to predetermined fixed stars through gyro-stabilized servomechanisms which, in turn, make in-flight corrections of the base position with respect to both the star positions and with respect to space and sidereal time and flight attitudes of the craft so that the horizontal base 319 maintains a position with respect to earth which is perpendicular to a line as (OT, OM or OM' in FIG. 1) from the instantaneous position of the craft to the center of the earth. It is upon this horizontal base 319, accurately stabilized by the operation of the star-tracker 300 to its horizontal position, that two accelerometers 320 and 321, respectively, are mounted. Accelerometer 320 is oriented on this base so as to develop a voltage corresponding to accelerations in the E—W direction. Accelerometer 321 is oriented on this base so as to develop a voltage corresponding to accelerations in the N—S direction. The accurate determination of the N—S direction is one of the functions of the star-tracking mechanism. In the Northern Hemisphere, the star Polaris may be employed for the polar telescope to follow. Polaris is within approximately 58 minutes of the direction of true North. (The declination of Polaris is currently lessening at the rate of about one minute of arc per year. The values for any particular year and any particular time of day, with respect to any longitude, may be found in any air or nautical almanac). The adjustment of the telescopes 303 and 304 to point to and follow Polaris, and another start in the equatorial plane, establishes the N—S direction and also, accordingly, provides a reference corresponding to the meridian line to establish the present position. The E—W direction is established from the N—S reference. Both telescopes are required to establish any reference line not passing through a star.

The star-tracking mechanism 300 is adjusted to automatically and continuously sight a star in the polar direction such as Polaris, and a selected equatorial star. As the craft flies its course to the destination, all of the required sight adjustments and corrections are continuously and automatically made by the automatic servomechanisms 308, 309, 310, 311 and gyros 306 and 307 responsive to photoelectric and other control mechanisms. The automatic star-tracking mechanism 300 may be operated on star sights even under daylight sky conditions as hereinbefore noted. Under daylight conditions, the star-tracking telescopes 343 and 304 are pointed at the stars through rotating episcotisters in the manner disclosed in the aforementioned application for patent on an "Electro-Optical Astrometrical System," Serial No. 188,401. Photoelectric devices are employed in the astrometrical system to provide control signals to control mechanisms which point the telescopes to the desired stars and cause the telescopes to follow them. The gyros 306 and 307 operate to hold the star-tracker 300 to point in the direction last attained when an overcast may obscure the stars for a period of time. During the period of obscuration, the horizontal base 319 and star-tracker 300 are stabilized by the gyros 306 and 307. When a clear sight is again possible, the automatic sighting of the telescopes is again effective. This would be likely to occur in short order at very high speeds when the craft passes through the overcast into clear atmosphere again.

The accelerometers 320 and 321, mounted on stabilized horizontal base 319, may be of the pendulous type which produces an output signal when the pendulum swings so as to be suspended in any position other than vertical. The signals are developed in a quadrature circuit system with respect to one direction in the plane of motion (as in the case of E—W accelerometer 320) and produce a positive or negative D.-C. voltage.

So that a mathematical discussion of the system may be made hereinafter, the term $A_E/R$ is assigned to the D.-C. voltage developed as a result of E—W acceleration. The D.-C. voltage developed as a result of operation of the N—S accelerometer 321 is assigned the term $A_N/R$. R, in these cases, is the earth's radius, as has been previously noted.

The E—W accelerometer D.-C. output voltage is applied to a multiplier 322 wherein voltages corresponding to the ellipticity correction and the secant-of-latitude derived from a computer shown in block 333 are inserted. The product of the voltages applied to multiplier 322 is applied to adder 323 wherein a voltage from deviation compensator 334 is added. The sum of the voltages applied to adder 323 is applied to E—W first integrator 324. The output signal of integrator 324 is a D.-C. voltage applied to second E—W integrator 325. Another output voltage $\theta_E$ is applied to the navigation computer 302 as further described below.

At this point, reference is again made to the integrators 324, 325, 328, and 329 which are all alike and may be of the type disclosed by T. E. Woodruff in the above-mentioned patent application, Serial No. 320,311. Special characteristics of the integrators referred to above are that they are extremely linearly responsive to a varying D.-C. input voltage and deliver, as an output, a shaft rotation linearly proportional to the integral of the input voltage. An intermediate step in the process, as described in the aforementioned Woodruff application, Serial No. 320,311 is the conversion of the varying D.-C. input voltage by the integrating system to a series of pulses at an output frequency linearly proportional to the D.-C. voltage input. These pulses, in turn, drive a stepping motor which is part of the integrating system. The shaft rotation of the stepping motor is then proportional to the integral of the input D.-C. voltage. Function potentiometers in appropriate voltage divider circuits may be driven by the shaft of the stepping motor to provide a D.-C. output voltage which is then the integral of the D.-C. input voltage. Other mathematical functions or arguments may be generated in this way. An example of the "stepping motor" above referred to is disclosed in Patent Number 2,627,040, issued January 27, 1953, to S. Hansen.

The second E—W integrator 325, identical in operation to the first integrator 324, operates on the D.-C. output voltage of integrator 324, corresponding to $\theta_E$. Integrator 325 has an output in the form of a stepping motor shaft rotation also. This shaft rotation corresponds to $\theta_E$, the integral of $\theta_E$. The output $\theta_E$ of integrator 325 is, therefore, the double integral of the D.-C. voltage $A_E/R$ as corrected for earth rotation conditions, etc., and applied to the input of integrator 324. The voltage $A_E/R$ is derived originally from E—W accelerometer output. The shaft rotation $\theta_E$ is a measure of longitude change over the measurement time interval and drives longitude indicator 330.

The output of N—S accelerometer in the form of a D.-C. voltage $A_N/R$ is applied to multiplier 326 where a sine-and-ellipticity correction factor, developed in sine-and-ellipticity correction generator 345, is inserted. The product of the sine-and-ellipticity factor and accelerometer output voltages is applied to an adder 327 where a voltage from deviation compensator 334 is added. The output sum of the voltages applied to adder 327 is applied to N—S first integrator 328. Integrators 328 and 329, in series, operate in the same manner as integrators 324 and 325, described above, to develop an output at the N—S second integrator 329 corresponding to the double integral of the D.-C. voltage applied to the N—S first integrator 328. The output is also a shaft rotation. The shaft rotation $\theta_N$ corresponds to the angle of the change in latitude position over the measurement time interval and drives the latitude indicator 332.

As has been previously pointed out, the purpose of the present-position computer incorporating dashed blocks 300 and 301 of FIG. 3, is to continuously calculate the present position of the carrying craft and to continuously indicate the resultant latitude and longitude of its position. The interconnection and operation of the equipment performing these calculations has been described above.

The input data to the present-position computer 301 are as follows:

$A_E/R$ = a D.-C. voltage from E—W accelerometer 320 representing easterly acceleration. Westerly acceleration would then be a negative value.

$A_N/R$ = a D.-C. voltage from N—S accelerometer 321 representing northerly acceleration. Southerly acceleration would then be a negative value.

$W_e$ = a D.-C. voltage representing the angular velocity of earth's rotation.

The output data calculated by the computer are as follows:

$\theta_N$ = a shaft rotation, the output of N—S second integrator 329 representing latitude, which drives the latitude counter dial 332; is fed back to the latitude axis drive 313 of the accelerometer base 319 to keep it level; is utilized by the navigation computer 302 to derive signals for control of the craft; $\theta_N$ is applied to cosine-of-latitude generator 335 and trigonometric computer 331 in the navigation computer.

$\theta_E$ = a shaft rotation, the output of E—W second integrator 325, representing longitude, which drives the longitude counter dial 330; is used as a feedback to the longitude axis drive 312 of the accelerometer base 319 to keep it level; is utilized by the navigation computer 302 to derive signals for control of the craft.

$\dot\theta_N$ = a D.-C. voltage output from first N—S integrator 328 utilized within the present position computer by compensator 334 to develop proper deviation compensation voltages. $\dot\theta_N$ is representative of the rate of change of latitude. The voltage $\dot\theta_N$, as an A.-C. voltage, is also applied to resolver 337 in the navigation computer 302.

$\dot\theta_E$ = a D.-C. voltage output from first E—W integrator 324. It is utilized within the present-position computer by compensator 334 to develop proper deviation compensation voltages. $\dot\theta_E$ is representative of the rate of change of longitude. $\dot\theta_E$, as an A.-C. voltage, is also applied to multiplier 336 in navigation computer 302 as part of the steering control.

$\theta_E$ = the indicated longitude.

$\theta_N$ = the indicated latitude.

$e$ = ellipticity of the earth from the elliptical approximation to the shape of the earth.

Referring to the block diagram of FIG. 3, the operation of the present-position computer in its calculation of latitude and longitude may be followed as the terms referred to hereinabove are generated and employed.

The E—W channel of the present-position computer will be considered below:

The output of E—W accelerometer 320, D.-C. voltage, $A_E/R$ is first multiplied in multiplier 322 by secant-and-ellipticity function, $$\sec \theta_N (1-e \sin^2 \theta_N) \qquad (1)$$

This multiplication compensates for the convergence of the longitude circles and the different diameters of the latitude circles due to the shape of the earth. The multiplication is performed by applying the D.-C. voltage output $A_E/R$ of the E—W accelerometer 320 across a function potentiometer having the required resistance as a function of the latitude input drive $\theta_N$, derived from N—S second integrator 329.

In adder 323 a correction for coriolis force and earth rotation is added to the voltage output resulting from the above-described multiplication function. This correction is $$2\theta_N(\theta_E + W_e) \tan \theta_N (1 - 2e \cos^2 \theta_N) \quad (2)$$

The correction (2) is generated in deviation compensator 334 by utilization of shaft rotations $\theta_N$ from first N—S integrator 328, $\theta_E$ from first E—W integrator 324, $W_e$, generated in compensator 334 and $\theta_N$, the output of second N—S integrator 329. Within compensator 334 a function potentiometer generating the function $$\tan \theta (1 - 2e \cos^2 \theta_N) \quad (3)$$

is driven by the shaft rotation $\theta_N$.

The corrected acceleration from E—W accelerometer 320, then, is the corrected E—W acceleration designated $\ddot{\theta}_E$ and may be represented by $$\ddot{\theta}_E = \frac{A_E}{R} \sec \theta_N (1 - e \sin^2 \theta_N) + 2\theta_N$$

$$(\theta_E + W_e) \tan \theta_N (1 - 2e \cos^2 \theta_N) \quad (4)$$

and is the varying D.-C. input voltage to first E—W integrator 324. $\ddot{\theta}_E$ is integrated twice to compute the longitude angle $\theta_E$. $\theta_E$ is fed back to orient the E—W accelerometer to a level position as has been previously pointed out.

The N—S channel of the present-position computer operates in a similar manner to compute a corrected N—S acceleration to provide $\ddot{\theta}_N$, the varying D.-C. input to first N—S integrator 328.

An ellipticity correction, $1 + 0.5e + 1.5e \cos^2 \theta_N$ is applied to multiplier 326. The correction is generated by a function potentiometer in ellipticity correction generator 345 in a similar manner to that described for the E—W channel. A deviation correction generated in deviation compensator 334 is added to the resultant output of multiplier 326 in adder 327. The correction voltage is equal to $$-1/2\theta_E(\theta_E + 2W_e) \sin^2 \theta_N (1 + 2e \cos^2 \theta_N) \quad (5)$$

This is generated in a manner similar to that described for the E—W channel.

The varying D.-C. voltage corresponding to corrected acceleration applied to the input of first N—S integrator 328 then is $$\ddot{\theta}_N = \frac{A_N}{R} (1 + 0.5e + 1.5e \cos^2 \theta_N) - 1/2\theta_E$$

$$(\theta_E + 2We) \sin^2 \theta_N (1 + 2e \cos^2 \theta_N) \quad (6)$$

Double integration of $\ddot{\theta}_N$ yields $\theta_N$, the latitude angle. $\theta_N$ is fed back to orient the N—S accelerometer to a level position as has been previously pointed out.

Signals from the present-position computer corresponding to $\theta_N$ (latitude), $\theta_E$ (longitude), $\dot{\theta}_E$ (E—W velocity), and $\dot{\theta}_N$ (N—S velocity) are applied to the navigation computer 302.

Navigation computer 302, shown in simplified block form in FIG. 3 and in a more detailed block diagram in FIG. 5, utilizes the signals from the present-position computer along with preset signals corresponding to the latitude and longitude of the destination or target point. For the computation of the course direction, true bearing and remaining range, the following terms are employed:

$\theta_N$ = latitude of present position
$\theta_E$ = longitude of present position
$\phi_N$ = latitude of destination or target
$\phi_E$ = longitude of destination or target
$A$ = true bearing angle $T$ = target (destination) position on earth sphere
$M$ = present position on earth sphere The course equation solved by the navigation computer is:

$$\tan A = \frac{\sin (\theta_E - \phi_E) \cos \phi_N}{\sin (\phi_N - \theta_N) + \sin \theta_N \cos \phi_N [1 - \cos (\theta_E - \phi_E)]} \quad (7)$$

In the above equation, $\theta_N$ and $\theta_E$ are continuously varying known quantities, $\phi_N$, $\phi_E$ and $\cos \phi_N$ are fixed known quantities. Instrumentation of a computer that can solve the equation may be accomplished as described below.

Simplification of many mathematical equations is possible when certain limits are not exceeded. The equation of tan $A$ may be simplified in the following way: When the latitude difference $\theta_E - \phi_E$ and longitude difference $\theta_N - \phi_N$ become very small, then the sine of the angle approaches the angle and the cosine approaches unity. Applying these criteria to the course equation:

$$\theta_E \rightarrow \phi_E$$
$$\theta_N \rightarrow \phi_N$$

The course equation reduces to:

$$\tan A = \frac{(\theta_E - \phi_E) \cos \phi_N}{\phi_N - \theta_N} \quad (8)$$

if the earth were treated as plane instead of spherical.

If the craft is sufficiently close to the target, the surface of the earth is treated as plane. The instrumentation necessary is thus simplified by the simplification of the course equation.

FIG. 5 to which reference is now made is a more detailed block diagram of the navigation computer shown in the dashed block 302 of FIG. 3. The navigation computer receives position input signals corresponding to present position, target position and turn point position. In addition, velocity signals corresponding to an E—W velocity vector and an N—S velocity vector are applied to the navigation computer.

Constantly varying signals corresponding to present position information $\theta_N$, $\theta_E$, from the present-position computer 301 are applied to present-position input 501. Fixed quantity target-position signals $\phi_N$, $\phi_E$ are applied to target-position input 502. Fixed-quantity position signals $\phi_N'$, $\phi_E'$ corresponding to a first or turnpoint destination are applied to turnpoint position input 503. The terms $\phi_N$, $\phi_E$, $\phi_N'$, $\phi_E'$ refer to fixed positions of rotary devices that may be adjusted for presetting the signals corresponding to these positions into the respective position inputs 502, 503. These signals are in the form of angular shaft rotations corresponding to the earth coordinate angles of latitude and longitude which each represents.

The present-position input 501 is coupled to both a plane case trigonometric computer 504 and a spherical case trigonometric computer 505. A single-pole double-throw switching means 506 is coupled both to the plane case computer 504 and spherical case computer 505. A normally-closed contact 507 of switch 506 is coupled to the turnpoint position input 503 and a normally-open contact 508 of switch 506 is coupled to target-position input 502.

A single-pole double-throw switch 509 is coupled to a resolver 510 which receives the output of either spherical case computer 505 through normally-closed switch contact 511 or the output of the plane case computer 504 through switch contact 512. The output of resolvers in the block shown at 510, in the form of signals (shaft positions) representative of course bearing and magnitude, is applied through difference computer 339 to the autopilot 340.

The switches 506 and 509, respectively, are part of an automatic mechanism which, as will be more fully described below, brings the appropriate switch position into operation to apply, for example, target-position signals from target-position input 502 through switch contact 508 to the spherical-case computer 505 and plane-case computers 504 when the turn-point position has been reached.

Figure 7:
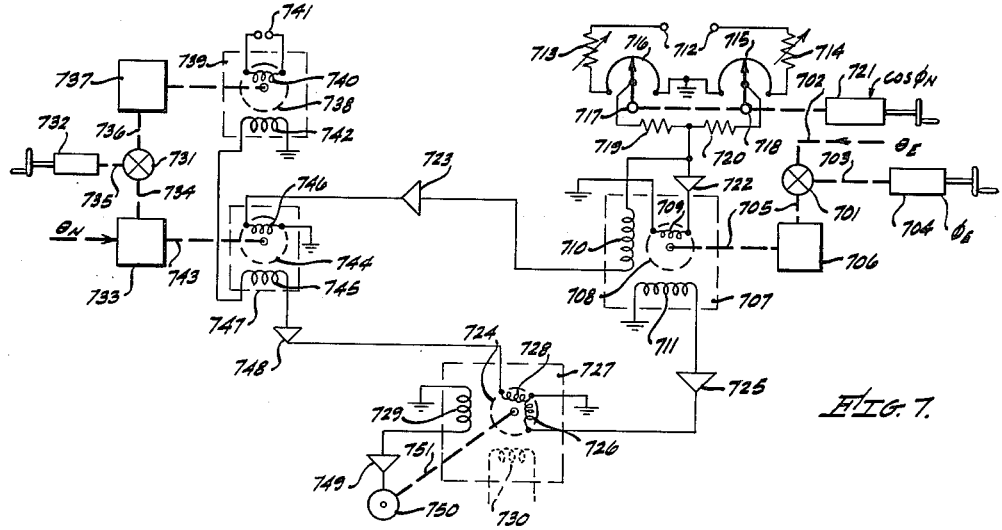
FIG. 7 is a simplified schematic circuit diagram of he spherical case computer, part of the navigation computer.

The spherical-case computer 505 includes two phase resolvers for generating the transcendental functions of the course Equation 7 above, and means for generating cosine-of-latitude (cos $\theta_N$). The use of resolvers and potentiometers in this fashion is well known. The circuit details are shown in FIG. 7. A more detailed description of the spherical-case computer is given below.

The plane-case computer 504 includes linear potentiometers employed as further described below. The employment of linear potentiometers in computing devices is also well known.

An electrical signal having a magnitude corresponding to the velocity term $\theta_N$ is applied to N—S ground speed input 515. An electrical signal derived from E—W first integrator 324 having a magnitude corresponding to velocity term $\theta_E$ is applied to E—W ground speed input 516. A function corresponding to cos $\theta_N$ is also applied to E—W ground speed input 516 where the cosine function is multiplied with $\theta_E$. (In FIG. 3 this is shown at 335 and 336.) Both ground speed inputs 515 and 516 are coupled to a ground speed computer 517. Ground speed computer 517 corresponds to the resolver 337 shown in FIG. 3. A single-pole double-throw switch 518 is coupled to an integrator 519. Normally-closed contact 520 of switch 518 is connected to the range magnitude output of remaining range resolver 510. Normally-open contact 521 of switch 518 is connected to the output of ground speed computer 517.

An output of integrator 519 is connected to an "on-target" indicator 522.

Another output of ground speed computer 517, in the form of a shaft rotation, is coupled through difference computer 339 to autopilot control 340. The difference computer 339 is a differential gear mechanism. Autopilot control 340 is of a known type generally employed in aircraft.

A third output of the ground speed computer 517 is coupled to ground speed indicator 338.

Figure 6:
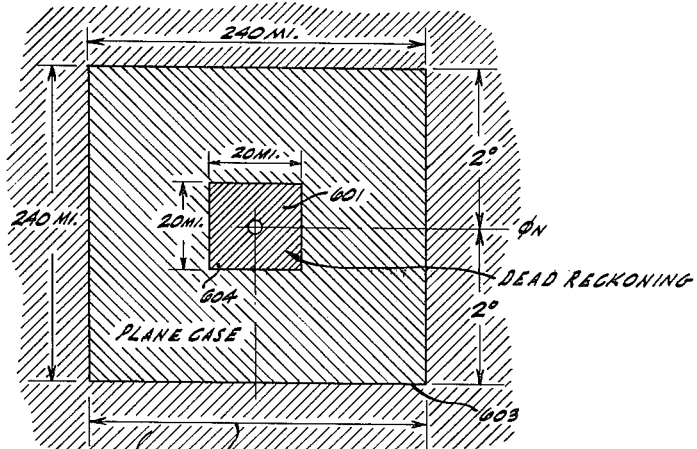
FIG. 6 is a diagrammatic area representation of the hre conditions of operation of the navigation computer, he spherical case, the plane case and the dead reckoning ase.

FIG. 6 illustrates the relative areas in which the several computing functions are performed in sequence in the navigation computer 301 as the craft carrying the automatic celestial navigation system of this invention flies to a particular destination. The destination may be the turn-point position or it may be the target position.

Because components of a system, such as employed in this invention, have certain finite limitations with respect to accuracy, the instrumentation to be utilized throughout the flight must be changed as the target 601 (final destination or turn-point) is approached by the craft through three regions surrounding the target shown in FIG. 6.

Each of the three regions is designated in terms of the type of computer employed in the area. They are called the spherical case area 602, the plane case area 603, and the dead reckoning case area 604. These areas, shown in FIG. 6, are further discussed below in their relation to the computers.

Taking FIG. 5 and FIG. 6 together, the operation of the navigation computer is as follows:

The boundaries between the spherical case area 602 and the plane case area 603 are the parallels of latitude and meridians of longitude enclosing the latter, and provide a region for the plane case 603 equal to approximately 240 miles on a side. This is a distance equal to 4° in latitude and 4°×sec $\theta_N$ in longitude, with the target 601 located at the geometric center of the area 603. The boundaries between the plane case area 603 and the dead reckoning case area 604 are also the parallels of latitude and meridians of longitude enclosing the latter. The target 601 is also located in the geometric center of this area 604 which has boundaries approximately 20 miles on a side.

It is the primary function of the navigation computer 302 to compute the course angle A (see FIG. 1). The navigation computer 302 produces two output signals, one of which is an "on-target" indication in on-target indicator 522 upon receipt of a signal from the output of dead reckoning integrator 519, and the second is a shaft rotation equal to the angle A (FIG. 1) corresponding to the desired true course bearing. This is compared with the instantaneous bearing of the velocity vector of the craft, V, derived from 517. The difference $A-V$ is converted from a shaft rotation to a D.-C. voltage in difference computer 339. The D.-C. voltage is applied to the autopilot control 340 in the computer 302. The autopilot 340 operates to maintain the output of difference computer 339 in a null condition resulting in an automatic controlled-heading flight.

The navigation computer 302, when utilized for both a target and a turn-point destination on flight of the craft, operates as a group of six computers. The computers are referred to in terms of the regions (see FIG. 6) in which they operate. As the craft passes from one region into the next, the appropriate computer is automatically switched into operation. The switching of the computers is accomplished by notched cams on the appropriate shafts operating switches, such as shown in elemental form in FIG. 5 at 506 and 509. The listing below is in the sequence in which the computers normally operate in a flight including one turn point.

(1) Turn point—spherical case computer
(2) Turn point—plane case computer
(3) Turn point—dead reckoning computer
(4) Target—spherical case computer
(5) Target—plane case computer
(6) Target—dead reckoning computer In the discussion below, remarks relating to spherical case computer 505 apply to 1 and 4 above. In the same manner, discussion of plane case computer 504 applies to 2 and 5 above, and discussion of dead reckoning computer 519 applies to 3 and 6 above.

In the spherical case computer, standard two-phase resolvers are employed in a well-known manner, whereby the rotor is positioned at an angle corresponding to the argument of the function with respect to a reference on the stator. If the argument (a rotor position of an input resolver in this instance) varies continuously, then the rotor of the output resolver is continuously driven. As can be seen from Equation 7 above, most of the arguments (inputs) are the difference between a constant and a variable.

The tan of angle A, Equation 7 above, is not specifically obtained. It is the shaft rotation angle A of the final resolver (as indicated at 510, FIG. 5). A full description of the operation of the resolver used to obtain the shaft rotation corresponding to angle A is given below. The magnitude of an output voltage, resulting from the voltages and rotations applied to the resolver, is representative of the distance from the present position to the target position. The resultant rotation is proportional to the angle of the rotor with respect to the stator and is representative of the desired true course bearing angle A.

The actual angles on the resolver shafts bear a one-to-one relationship to the angles of the earth's latitude-longitude co-ordinate system producing a single output shaft rotation of the spherical case computer as a resultant of several input shaft rotations, some fixed and some variable.

The operation of the plane case computer 504 is simplified by the fact that there are no varying transcendental functions. The terms are all linear and continuous representation is provided by linear potentiometers. One revolution of a potentiometer corresponds to going across the plane case region 603. As an example, one revolution of a latitude potentiometer corresponds to 240 miles.

The course angle A is obtained in the plane case computer by employing the same resolver shaft angle rotation that is used in the spherical case computer. In the plane case computer, the magitude, of an output voltage of the resolver is proportional to the remaining range to the target. This remaining range is converted into a shaft rotation for later use in the read reckoning computer 519.

Upon the operation of the dead reckoning computer 519, the shaft of the resolver providing the course angle A is locked. The resultant fixed course angle is treated as if it were varying in the same way as in the previous cases. The dead reckoning computer is switched into operation when the remaining range, as determined by the plane case computer, reaches a predetermined value such as 10 miles. The ground speed is integrated continuously as the craft travels form the point where the dead reckoning computer begins operation, thus computing the distance the craft has traveled toward the destination. When this computed distance equals the predetermined value, an on-target indicator is actuated.

The error in the heading angle as computed from the operation of the spherical computer increases as the remaining range decreases due to the natural limitations of components. The point at which this effect produces greater errors than those obtained by plane approximations is about 2° of the latitude-longitude co-ordinate system from the target. If a region 4° on a side then surrounds the target, this region effectively becomes a large target for the spherical case computer. The accuracy requirements placed upon the solution of the heading equation under these circumstances are not so stringent.

A target which is not on the equator of the latitude-longitude co-ordinate system would have a rectangle surrounding it instead of a square because the latitude parallels are not great circles. Near a pole, the plane case region would be very oblong. Because of the shape of this effective spherical case target area, the tendency would be to always approach it from east or west; therefore, the plane case area is determined by using the limiting criteria of 120 nautical miles. The boundary of the plane case area is 4° in length in the E—W direction. The N—S boundaries are $4° \times \sec \phi_N$ in length.

The plane case computation is justified by the fact that the surface of the earth is equally flat per given distance in miles in each direction regardless of latitude. For targets in higher latitudes (near the pole), the approximate mathematical expression for the heading Equation 8 is not so accurate at the meridian boundary as at the latitude boundary of the plane case region. Since the navigation system is designed to direct the craft on a straight line from its present position to a predetermined fixed destination point this makes no significant difference. The accuracy holds very well up to within 10° of the pole.

The plane case solution then may be considered as the solution of a plane right triangle whose two sides correspond to the remaining ranges in the E—W and N—S directions, respectively. The vector sum of these two ranges is calculated and the magnitude of the resultant is total remaining range.

As the craft approaches very near the target in its operation, the sides of the triangle get smaller and smaller. With existing equipment limitations, the dimensional value of the sides become indetermine. Consequently, tan A (A is the true bearing angle) becomes indeterminate. Additionally, the stringency of the requirements of the course servo loop become greater. This loop includes parameters representing velocity and remaining range of the craft and the operational system involving the control surfaces. The guidance problem is to keep the velocity vector and course (remaining range) vector aligned. As range becomes smaller, the loop gain of associated servo increases. Accordingly, at some point close to the target the loop would become unstable.

Because "on target" results when the magnitude of both of the two orthogonal co-ordinates (velocity vector and remaining range vector) are equal to zero at the same time, there is the possibility of overshoot.

Therefore, a third type of computation is employed by the navigation computer when the craft approaches very close to the target. This computation is of the dead reckoning type. The dead reckoning computer is set in operation when the craft is 10 miles from the target.

In the operation of the navigation computer for the dead reckoning case, the heading angle A, as simplified for the plane case in Formula 8, is held constant. The remaining-range servo loop of the system is opened. The remaining-range servo voltage at this point represents some predetermined number of volts per mile of remaining range. A potentiometer, when excited with this voltage, has an angular position of its shaft corresponding to miles from the target. A two-phase motor with reduction gears is employed in the dead reckoning case to accomplish this operation. One phase of the motor has a fixed voltage applied to it. The other is excited by the output of a servo amplifier whose input is the difference voltage between the potentiometer arm and the remaining-range resolver output. The servo action keeps this difference voltage at a null and so, as the remaining range voltage becomes smaller, the potentiometer shaft is driven in such a direction that the potentiometer arm approaches the bottom of the potentiometer. A cam with a detent also is fixed to the potentiometer shaft so that the bottom of the potentiometer can be indicated mechanically. At a range of 10 miles when the computer switches from plane case to dead reckoning, the potentiometer shaft is at an angle corresponding to 10 miles. The servo input is removed from the motor and is replaced by a voltage proportional to the magnitude of the ground speed of the craft.

The motor has the characteristic of rotating at a speed proportional to the applied voltage. Therefore the output shaft rotation of the motor is proportional to the time integral of the ground speed voltage which excites it, and the total angular rotation of the motor shaft during any interval of time is proportional to the distance traveled by the aircraft during that interval. The coupling between the motor and the potentiometer shaft is designed so that the rotation of the potentiometer by the motor conforms to the relationship of the angular position of the potentiometer shaft to distance. Thus the motor turns the potentiometer shaft towards its zero range position as the aircraft travels toward the destination position, and the arrival of the potentiometer shaft at its zero range position indicates the arrival of the craft at the destination.

When the shaft reaches the zero-range position, the attached cam actuates a switch to give an on-target indication.

It can be seen from the above description of this invention that when the system disclosed is installed in an aircraft and is operated in accordance with the above-mentioned principles, the apparatus may be set up so that the craft is automatically and accurately guided by the operation of the system according to this invention to a first terrestrial location and from the first location to a second terrestrial location without aid from any human agency beyond the initial setting up of the system in the aircraft for the desired destinations.

Referring now to FIG. 1, the course from a present position M, at latitude $\theta_N$ and longitude $\theta_E$ to a destination or target position T at latitude $\phi_N$ and longitude $\phi_E$, is a great circle course between the two points M and T. The angle A which this great circle course makes with the meridian on which M falls is the true course bearing angle. This angle is computed continuously by the navigation computer 302 as the craft approaches the target. The equation referred to above as (7) is solved continuously in terms of tan A by the spherical case computer portion of the trigonometric computer 331 (FIG. 3) including, in part, elements 505, 509, 510 (FIG. 5).

FIG. 7 is a simplified schematic diagram of the electrical circuits involved in the solution of the spherical triangle involving the angle A. When the craft is a distance approximately 120 miles from the target, the plane case computer including, in part, elements 504, 512, 509, 510 is rendered operative to thereafter complete the computation of the tan A in terms of the simplified Equation 8.

Figure 8:
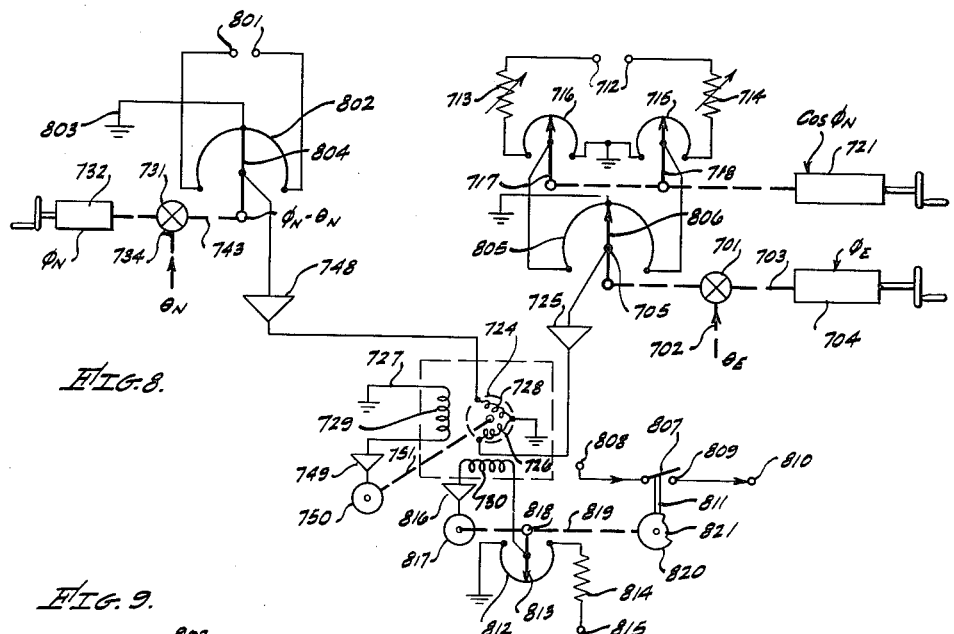
FIG. 8 is a simplified schematic circuit diagram of the lane case computer, part of the navigation computer; nd

FIG. 8 is a simplified schematic of the electrical circuits involved in the solution of the plane triangle involving the angle A. When the craft is within ten miles of the target the computation performed becomes a dead reckoning operation. The remaining range portion 510 of the trigonometric computer 331 and the ground speed portions of the ground speed and direction of ground speed computer 517 are employed as further detailed below to indicate the arrival of the craft at the destination position.

Figure 9:
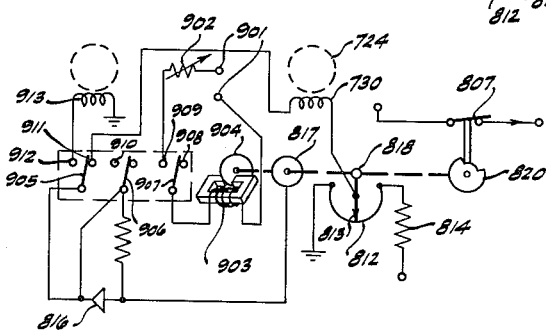
FIG. 9 is a simplified schematic circuit diagram of he dead reckoning computer, part of the navigation computer.

An embodiment of each of the three modes of computation, spherical, plane and dead reckoning, and the circuits employed are individually detailed in simplified schematic form in FIGS. 7, 8 and 9.

In FIG. 7, there is shown a simplified schematic diagram of components of the navigation computer in the circuit arrangements utilized in the first phase of the computation of the true course bearing angle A from the present position of the craft to the target. This condition has previously been referred to as target-spherical case.

Referring to FIG. 5, the spherical case is that in which switch arm 506 makes contact with terminal 508, and switch arm 509 makes contact with terminal 511. The components of the diagram shown in FIG. 7 are included in the blocks 505 and 510, respectively, of FIG. 5.

Referring now again to FIG. 7, a differential gear mechanism 701 is coupled by one of its input drives 702 to the longitude indicator drive 330, of the present-position computer 301, as shown in FIG. 3. A second input drive 703 of the differential gear is coupled to a manually-settable target longitude indicator 704. The rotation imparted to input drive 702 corresponds to $\theta_E$, the longitude of the present position. The rotation imparted to input drive 703 corresponds to target longitude and is referred to as $\phi_E$. The output shaft 705 of differential gear 701 is coupled through a gear reducer 706 to the rotor 708 of a two-phase sine-cosine resolver 707. The rotation of output drive 705 and, correspondingly, rotor 708 is proportional to the difference between $\theta_E$ and $\phi_E$. Rotor 708 is provided with a rotor winding 709. The resolver 707 also has two stator windings 710 and 711 at right angles to one another.

At input terminals 712 (top right center of FIG. 7) a predetermined A.-C. voltage is applied. Variable resistors 713 and 714 are provided for adjusting the value of A.-C. voltage applied across the variable potentiometers 716 connected between a terminal of resistor 713 and ground and variable potentiometer 715 connected between a terminal of resistor 714 and ground. Variable arms 717 and 718 of potentiometers 716 and 715, respectively, are both connected to the shaft of a manually-settable cosine of target latitude control 721. An electrical connection is made from arm 717 to resistor 719 and from arm 718 to resistor 720. Resistors 719 and 720 have their remaining terminals respectively connected together. The control 721 is adjusted so as to position the arms 717 and 718 on their respective potentiometers 716 and 715 to provide a voltage at the junction of resistors 719 and 720 proportional to the cosine of the target latitude (cos $\phi_N$). The voltage proportional to cos $\phi_N$ is applied to the rotor winding 709 of resolver 707 through an amplifier 722. The gain of amplifier 722 is adjusted to exactly compensate the internal losses in rotor winding 709. A connection is made from the junction of resistors 719 and 720 to one side of stator winding 710 of resolver 707. The other side of stator winding 710 is connected to an amplifier 723 having a unity gain. The polarity of the winding 710 is such that the voltage developed therein from the resolver operation is in subtractive relation to the voltage cos $\phi_N$ applied to it from the junction of resistors 719 and 720. Accordingly, therefore, the following voltage results at the input of the amplifier 723:

$$\cos \phi_N [1 - \cos (\theta_E - \phi_E)]$$

Resolver 707 is provided with an output stator winding 711 having its axis at right angles to the axis of stator winding 710. The operation of the resolver 707 results in a voltage output at winding 711 as follows:

$$\cos \phi_N \sin (\theta_E - \phi_E)$$

The output winding 711 is coupled to one rotor winding 726 of rotor 724 of resolver 727, through a unity gain amplifier 725. The voltage cos $\phi_N$ sin $(\theta_E - \phi_E)$ is applied to the winding 726.

A second differential gear mechanism 731 is coupled by one of its input drives 734 through a gear reducer 733 to the latitude indicator drive 332 in the present-position computer 301, as shown in FIG. 3. Another input drive shaft 735 of differential gear 731 is coupled to a manually-settable target latitude indicator 732. The rotation imparted to input drive 734 corresponds to the latitude of present position $\theta_N$. The rotation imparted to input drive 735 corresponds to the target latitude $\phi_N$. The output shaft 736 of differential gear 731 is coupled through a gear reducer 737 to the rotor 738 of a rotating transformer 739. Rotating transformer 739 is designed to generate the sine of the angle of rotation of its rotor 738. The resultant rotation of the output shaft 736 is proportional to $\phi_N - \theta_N$. The rotor 738 has a rotor winding 740. The rotor winding 740 is excited by an alternating voltage of predetermined magnitude applied to terminals 741 to which the winding 740 is connected and by an alternating voltage of predetermined magnitude of the same frequency as the A.-C. voltage applied at terminals 712. Rotary transformer 739 has a stator winding 742. The voltage developed in the stator winding 742 of the transformer 739 is proportional to the sine of the angular rotation of its rotor 738. The angular rotation of the rotor is proportional to $\phi_N - \theta_N$. Accordingly, there is produced in winding 742 a signal corresponding to:

$$\sin (\phi_N - \theta_N)$$

Reduction gear 733 has an additional output shaft 743 which is coupled to the rotor 744 of a rotary transformer 745. Transformer 745 is of the same type as transformer 739. A rotation corresponding to $\theta_N$ will be imparted to rotor 744. Rotor 744 has a rotor winding 746. Transformer 745 has a stator winding 747 connected in series with stator winding 742 of transformer 739. The signal corresponding to sin $(\phi_N - \theta_N)$ is also present in addition to others noted below.

The rotor winding 746 of transformer 745 is connected to amplifier 723 previously noted. Accordingly, the signal corresponding to cos $\phi_N [1 - \cos (\theta_E - \phi_E)]$ is the excitation voltage for the rotor winding 746. Like transformer 739, transformer 745 produces an output signal in its stator winding 747 corresponding to the sine of the angular rotation of its rotor 744. Therefore, the signal now present in the stator winding 747 corresponds to:

$$\sin (\phi_N - \theta_N) + \cos \phi_N \sin \theta_N [1 - \cos (\theta_E - \phi_E)]$$

The series circuit of stator windings 747 and 742 is coupled to rotor winding 728 of resolver 727 through an amplifier 748 which has a gain sufficient to compensate for any losses occurring in rotor winding 728.

It may now be seen that resolver 727 has applied to it two rotor windings 726 and 728, respectively, the signals corresponding respectively to:

$$\cos \phi_N \sin (\theta_E - \phi_E)$$

and $$\sin (\phi_N - \theta_N) + \cos \phi_N \sin \theta_N [1 - \cos (\theta_E - \phi_E)]$$

The construction of resolver 727 is such that the angu lar rotation of its rotor 724 is proportional to the angle A represented by the arc tan of the quotient of the voltages applied to the rotor windings 726 and 728. The angle A is the desired true bearing angle referred to above. In stator winding 729 a voltage is produced corresponding to:

$$\tan A = \frac{\cos \phi_N \sin (\theta_E - \phi_E)}{\sin (\phi_N - \theta_N) + \sin \theta_N \cos \phi_N [1 - \cos (\theta_E - \phi_E)]}$$

The shaft 751 of rotor 724 of resolver 727 is mechanically coupled to a motor 750. The output stator winding 729 of the resolver 727 is coupled to motor 750 through amplifier 749. Motor 750, amplifier 749 and resolver 727 thereby are formed into a servo loop so as to correct for any inaccuracies and maintain the accurate positioning of the resolver rotor 724 to correspond to an angular rotation representing the true bearing angle A. An additional stator winding 730 of resolver 727, shown dashed in FIG. 7, is not used in the spherical case computation, but is employed in the plane case computation as described below.

The operation of the spherical case computer as shown in FIG. 7 is as follows: Information signals are derived from the present-position computer corresponding to the latitude $\theta_N$ and longitude $\theta_E$, respectively, of the present position of the craft in the form of angular rotation of the output shafts of the present-position computer. Manually-settable rotary devices produce information signals representative of the desired target latitude $\phi_N$ and longitude $\phi_E$. These are in the form of appropriate angular rotations. The actual angles of the resolver shafts to which these rotations are applied correspond directly to the actual latitude and longitude earth coordinate angles which they represent. In the spherical case computer, through the use of resolvers and mechanical drive mechanisms, a voltage is produced corresponding to numerator term $\cos \phi_N \sin (\theta_E - \phi_E)$, and another voltage is developed corresponding to a denominator term $$\sin (\phi_N - \theta_N) + \cos \phi_N \sin \theta_N [1 - \cos (\theta_E - \phi_E)]$$

These two voltages are applied to the rotary winding of a two-phase tan-cotan resolver. There is a resultant angular displacement of the rotor of this resolver corresponding to the angle "A." In an output winding of the tan-cotan resolver, a voltage is produced corresponding to the tan of angle A and equal to the voltage represented by the numerator term divided by the voltage represented by the denominator term.

In FIG. 8 the plane case trigonometric computer is shown in simplified schematic form. As has previously been described the plane case computer comes into operation when the craft has reached a point approximately 120 miles from the target. In the plane trigonometric computation of tan A, the terms of the Equation 8 are all linear so that the representations of the terms of the equation can be accomplished through the use of linear potentiometers with appropriate voltages across them. Referring to FIG. 8, an A.-C. voltage is applied to terminals 801 which appears across potentiometer 802. The voltage applied is representative of the distance 240 miles and so the voltage between each of the terminals 801 and the grounded center tap 803 represents 120 miles. The arm 804 of potentiometer 802 is coupled to the target latitude ($\phi_N$) indicator 732 and to the present latitude ($\theta_N$) indicator 332 through differential gear 731, the same employed in the spherical case computation as described above. The motion of the arm 804 then corresponds to $\phi_N - \theta_N$, the latitude difference, and the phase of the voltage developed will depend upon whether the craft is north of the target or south of the target. This voltage corresponding to $\phi_N - \theta_N$ is applied to the denominator rotor winding 728 of resolver 727 through the amplifier 748. It can be seen here by comparison with FIG. 7, that in the plane case there are no resolvers interposed between the reference voltage source and the target position and present position rotational information sources, as there were for the spherical case. The latitude and longitude indicator drives are directly coupled to the linear potentiometers so as to provide linear rotation vs. voltage conditions.

As has previously been described in connection with FIG. 7, an A.-C. voltage is applied to terminals 712 and the variable resistance network comprising resistors 713, 714, 715 and 716. In the plane case computer operation, as in the spherical case computer operation the arms 717 and 718 respectively of resistors 716 and 715 are mechanically coupled to $\cos \phi_N$ indicator adjustment 721. Therefore the position of the indicator 721, once set up remains the same throughout the operation of the navigation computer during both the spherical case and plane case operation, and accordingly the voltage appearing between the arms 717 and 718 remains at a fixed value corresponding to $\cos \phi_N$. In the plane case operation a center-tapped potentiometer 805 is connected between the potentiometer arms 717 and 718. The voltage between arm 717 and ground, and arm 718 and ground, respectively will be of opposite phase. Arm 806 of potentiometer 805 is coupled by its shaft to target longitude ($\phi_E$) indicator adjustment 704 and to present longitude ($\theta_E$) position indicator 330 through differential gear 701, the same one employed in the spherical case phase for the computations of angle A. The motion of the arm 806, then, corresponds to the longitude difference $\theta_E - \phi_E$ and the voltage at arm 806 accordingly corresponds to $\cos \phi_N (\theta_E - \phi_E)$.

The voltage $\cos \phi_N (\theta_E - \phi_E)$ is applied through amplifier 725 previously described to the numerator winding 726 of rotor 724 of resolver 727. The rotor 724 of resolver 727 will assume an angular position in response to the two voltages applied to its rotor windings. The angular position corresponds to the course angle A. As previously described the servo-loop incorporating the electrically connected winding 729, amplifier 749 and the windings of motor 750, and the mechanical coupling of the resolver rotor 724 and shaft of motor 750, provides control of the positioning of the rotor 724 to maintain its accuracy.

A voltage is produced in winding 730 as a result of the plane case operation of the trigonometric computer. This voltage corresponds to the remaining distance between the present position (M) of the craft and the target position (T), as shown in FIG. 1. The remaining distance voltage is applied to a motor 817 through an amplifier 816. The shaft 819 of motor 817 is mechanically coupled at 818 to the variable arm 813 of a potentiometer 812 and a cam 820. The arm 813 is electrically connected to the remaining range resolver winding 730. Potentiometer 812 is connected in series with a resistor 814 between a terminal 815 and ground. A predetermined A.-C. voltage is applied to terminal 815. The A.-C. voltage applied to terminal 815 may be phased so that when the arm 813 is positioned by motor 817 to correspond to remaining range, the voltage appearing at the input of amplifier 816 is equal to the difference between the remaining range voltage and the voltage at the arm 813 of potentiometer 812. The closed cycle servo-loop thus formed by amplifier 816, motor 817 and potentiometer arm 813 maintains this difference voltage at zero.

During the plane case computation the motor 817 in its servo loop drives the arm 813 of potentiometer 812 closer to its grounded end as the craft approaches nearer to the target. Cam 820 rotates with the potentiometer arm 813. Cam 820 has a detent section 821 which permits a switch arm 807 to close against terminal 809 to deliver an operating voltage applied at terminal 808 to a relay connected (but not shown) at terminal 810. Detent 821 is so positioned on cam 820 that the closing of contact arm 807 against contact terminal 809 occurs when the remaining range voltage at terminal 813 corresponds to a location of the craft exactly on target.

In FIG. 9, there is shown a circuit of the type that may be used for the dead reckoning phase of the operation of navigation computer 301. At a position of the shaft of motor 817 where the voltage on arm 813 corresponds to a remaining range of ten miles, a relay whose contacts only are shown in FIG. 9 at 905, 906, 907, 908, 909, 910, 911, 912, operates to remove the remaining range voltage from the motor 817, to be replaced by a voltage proportional to ground speed derived from the ground speed computer 517 (FIG. 5). At the same time a speed controlling element such as eddy current brake 904 is brought under the influence of its electromagnetic control circuit 903 by the application of a D.-C. potential to terminals 901. A rheostat 902 is adjustable so that the current through electromagnetic control circuit 903 may be set at some predetermined level. The control circuit incorporating brake 903, 904 may be replaced by other known motor speed control systems such as a tachometer speed control system. Thus the motor 817 during the dead reckoning phase of the operation of the navigation computer is driven by voltage from the ground speed computer. This voltage is derived from an output winding 913 of a resolver part of block 517 (FIG. 5). The speed of the motor is controlled by the control device 903, 904 as described above. The shaft of potentiometer 812 coupled to the motor 817 is then rotated to its terminal position corresponding to the arrival of the craft at its destination.

I claim:

1. In an automatic celestial navigation and guidance system for aircraft, an electrical present-position computer, said present-position computer including: a platform, an automatic star-tracking means mounted on said platform; means coupled to said star-tracking means for space stabilizing said platform; and accelerometer platform; means coupled to said accelerometer platform and to said space-stabilized platform to maintain said accelerometer platform in a horizontal plane with respect to the earth's surface independently of the attitude of said aircraft; first and second accelerometers mounted on said accelerometer platform and responsive to accelerations of the aircraft in the North-South direction and in the East-West direction, respectively, to generate electrical signals representative of said accelerations; North-South electronic integrator means coupled to said North-South accelerometer for developing a North-South velocity signal and a present-latitude signal; East-West electronic integrator means coupled to said East-West accelerometer for developing an East-West velocity signal and a present longitude signal; servocontrol means coupled to said accelerometer platform; present-position-signal feedback means coupled between both said integrators and said servocontrol means for applying said present-latitude and longitude signals to said control means to rotate said accelerometer platform about its axes to correct the orientation of the said platform in the horizontal plane with respect to the change in latitude and longitude position of the aircraft; a correction signal generator coupled to both said integrators including means responsive to said present-latitude signal and said present-longitude signal and to said velocity signals to develop electrical correction signals to compensate for centrifugal forces and coriolis forces of the earth's motion and for the earth's spheroidal shape; and means coupled to said correction signal generator for correcting said accelerometer signals in response to said correction signals so that the said present position signals developed from said accelerometer signals accurately represent the latitude and longitude, respectively.

2. Apparatus for computing the present position of a moving aircraft in earth latitude and longitude co-ordinates comprising: a platform, an automatic star tracking means mounted on said platform; means coupled to said star tracking means for space stabilizing said platform; an accelerometer platform; means coupled to said accelerometer platform and to said space-stabilized platform to maintain said accelerometer platform in a horizontal plane with respect to the earth's surface independently of the attitude of said aircraft; first and second accelerometers mounted on said accelerometer platform and responsive to accelerations of the aircraft in the North-South direction and in the East-West direction, respectively, to generate direct current electrical signals representative of said accelerations; North-South electronic integrator means coupled to said North-South accelerometer for developing a North-South electrical velocity signal and a present-latitude signal; East-West electronic integrator means coupled to said East-West accelerometer for developing an East-West electrical velocity signal and a present-longitude signal; control means coupled to said accelerometer platform; present-position-signal feedback means coupled between both said integrators and said control means for applying said present-latitude and longitude signals to said control means to rotate said accelerometer platform about its axes to correct the orientation of the said platform in the horizontal plane with respect to the change in latitude and longitude position of the aircraft; a correction signal generator coupled to both said integrators including electronic means adapted to be responsive to said present-latitude signal and said present-longitude signal and to said velocity signals to develop correction signals to compensate for centrifugal forces and coriolis, forces of the earth's motion and for the earth's spheroidal shape; and electrical means coupled to said correction signal generator and including multiplying and adding means coupled for correcting said accelerometer signals in response to said correction signals so that the said present-position signals developed from said accelerometer signals accurately represent the latitude and longitude, respectively.

3. A system for automatic unattended navigation and guidance of airborne craft from one terrestrial location to a sequence of other destination positions comprising: a present-position computing means including space stabilized means; accelerometer means having its orientation controlled by said space stabilized means to develop latitude and longitude acceleration signals; correction means coupled for adding and subtracting to said acceleration signals to compensate for centrifugal and coriolis forces of the earth's motion and for the earth's shape; and integrator means for generating signals representing velocity and present position of the aircraft in latitude and longitude co-ordinates; manually-settable means adapted for generating signals representative of the latitude and longitude of said destination positions and a navigation-computing means coupled to said present-position computing means and said destination-position signal generating means and adapted for generating a signal representative of a course from said present position to the respective destination position and for producing error signals representative of any difference between said computed course and the actual course of the aircraft, said navigation computer including a first mean adapted for generating a first electrical course signal representative of the course from the present position of the aircraft to a first destination position; second mean responsive to said first electrical course signal and adapted to generate a second electrical course signal when said first destination position has been reached, said second electrical course signal being representative of the course from the current position of the aircraft to second destination position; and an automatic pilot coupled to said navigation-computing means and to the control surfaces of the aircraft and adapted for guiding the aircraft on the correct flight courses.

4. In an automatic celestial navigation and guidance system for aircraft which includes an automatic electrical present-position computer including an automatic tracker of fixed celestial bodies, horizontally stabilized accelerometers coupled to said tracker and adapted to generate electric accelerometer signals representative of East-West and North-South accelerations with reference to polar and equatorial earth positions in relation to said fixed celestial bodies, and electronic double-integrating circuits coupled individually to said accelerometers and adapted for generating electrical signals representative of directional velocity and present latitude and longitude positions of the aircraft in response to said electric accelerometer signals; means responsive to said signals generated in said double integrating circuits for developing correction signals to compensate for the rotation and the shape of the earth; means for combining said correction signals with said accelerometer signals; a settable generator for developing electrical signals representative of the latitude and longitude of a destination position; a navigation computer coupled to said present-position computer and to said destination-position signal generator, said navigation computer including circuits responsive to said electrical directional velocity and present position signals and to said electrical destination position signals to generate a first electrical signal representative of a true course bearing from said present position to said destination position, and a second electrical signal in response to said directional velocity signals representative of the actual flight course direction, and including circuits for comparing said first and second electrical signals to generate an electrical error signal representative of any angular difference between the directions represented by said first electrical signal and said second electrical signal; and means coupled to said navigation computer for controlling the flight of said aircraft in response to said error signals.

5. In an automatic celestial navigation and guidance system for aircraft, a present-position computer including a star tracker, an electronic computer connected to said tracker, and circuits to generate first electrical signals representing present position of the aircraft in latitude and longitude and second electrical signals corresponding to the velocity of the aircraft in North-South and East-West directions; means responsive to said signals generated in said double integrating circuits for developing correction signals to compensate for the rotation and the shape of the earth; means for combining said correction signals with said accelerometer signals; means for generating predetermined electrical position information signals representing the latitude and longitude of a destination; a navigation computer coupled to said present-position computer and to said rotary transformer network, and including circuits responsive to said present position signals and said predetermined electrical position information signals to generate first electrical course signals representing a desired course from said present position to said destination; an actual course computer coupled to said present-position computer and including circuits to generate second electrical course signals representing the actual course of the aircraft; a comparator connected to said actual course computer and to said navigation computer and responsive to said first and second electrical signals to generate electrical error signals representing deviation in the flight of the aircraft from said desired course; and means coupled to said comparator and connected for guiding said aircraft on the desired course in response to said error signals.

6. In an automatic celestial navigation and guidance system for aircraft including a present-position computer for generating electrical signals representative of directional velocity and present position in latitude and longitude, and a settable signal generator for generating signals representative of latitude and longitude of a destination position: a navigation computer coupled to the present-position computer and to the destination-position signal generator including circuits for generating first electrical course signals in response to the present-position signals and the destination-position signals, said first electrical course signals being representative of the direction of the true course bearing and remaining distance from the present position to the destination position; a velocity and direction-of-flight signal generator coupled to the present-position computer and including circuits for generating a second electrical course signal representative of the actual flight course of the aircraft; an error-signal generator connected to said navigation-computer and to said velocity and direction-of-flight signal generator for developing error signals representative of an angular difference between said true course bearing and said actual flight course; an automatic pilot electrically connected to said navigation computer, to said error signal generator, and connected to control the aircraft in response to said error signals to maintain said error signal at a substantially zero value; and electrical control means coupled to said navigation-computer for producing a destination signal in response to the arrival of the aircraft at its destination.

7. An automatic celestial navigation and guidance system for aircraft comprising an automatic electrical present-position computing means adapted to generate signals representing present position of the aircraft in latitude and longitude coordinates, said computing means including an automatic tracker of fixed celestial bodies to develop a space stabilized means, accelerometer means referenced to said stabilized means for responding parallel to the earth's surface and with a fixed North-South orientation to generate electric accelerometer signals representative of East-West and North-South accelerations, double integrating circuits coupled to receive said accelerometer signals for generating signals representative of East-West and North-South velocity and distance of longitude and latitude movement, first means coupled to said integrating circuit to correct said accelerometer signals for ellipticity of the earth and second means coupled to said integrator circuit to correct said accelerometer signals for centrifugal and coriolis forces resulting from the rotation of the earth, indicator means coupled to said integrating circuits for indicating the present East-West and North-South position of said aircraft relative to a starting position, means for generating destination signals representative of the longitude and latitude of a destination point, navigation computing means coupled to said present position computing means for receiving said velocity and distance signals and to the destination signal generating means for receiving said destination signals to develop a first signal representative of a true course bearing from said present position to said destination point and a second signal representative of the actual flight course direction and including means for comparing said signals to produce an error signal indicating the directional difference between said error signal, and aircraft pilot means responsive to said error signal for guiding said aircraft to said destination point.

8. An automatic celestial navigation and guidance system for aircraft comprising a present position computer including stable means, for tracking fixed celestial bodies to provide a fixed space reference, a first and a second accelerometer for developing first and second acceleration signals, drive means coupled between said accelerometers and said stable means for maintaining said accelerometers in a desired latitude and longitude orientation in reference to present position, compensating means coupled to said accelerometers for correcting said acceleration signals to compensate for ellipticity of the earth and centrifugal forces resulting from rotation of the earth, first integrating means coupled to said compensating means for developing latitude and longitude velocity signals, second integrating means coupled to said first integrating means for developing latitude and longitude distance signals, rotary transformer means for developing position information signals representing the latitude and longitude of a destination, a navigation computer coupled to said present position computer and to said rotary transformer and responsive to said latitude and longitude velocity and distance signals and said present position signals to generate first course signals representing a desired course from said present position to said destination position, actual course computing means coupled to said present position computer for generating second course signals representing the actual course of the aircraft, comparator means coupled to said actual course computing means and to said navigation computer responsive to said first and second course signals to generate error signals representing the deviation in the flight of the aircraft from the desired course, and automatic pilot coupled to said comparator and to the control surfaces of said aircraft for guiding said aircraft to said destination.

9. The method of celestial navigation and guidance of airborne craft from a starting location to a destination location comprising the steps of: continually tracking fixed celestial bodies to develop reference signals having characteristics for establishing a horizontal reference plane with respect to the earth's surface; generating acceleration signals corresponding to East-West and North-South accelerations of the aircraft in flight in said horizontal reference plane; electronically integrating both of said acceleration signals twice to develop velocity signals and present position signals in terms of elapsed distance; generating first electrical correction signals representing the effects of the spheroidal shape of the earth; generating second electrical correction signals representing the effects of centrfugal and coriolis forces of the earth; multiplying said first electrical correction signals and said present position signals; adding said second electrical correction signals to said present position signals after being multiplied by said first correction signals; maintaining said reference plane horizontal in response to the corrected present-position signals; generating latitude and longitude signals representative of a destination position; generating a true course bearing signal in response to said corrected latitude and longitude present-position signals and said destination signals, said true course bearing signal being representative of the true course bearing from said present to said destination position; generating a direction-of-flight signal in response to said velocity signals, said direction-of-flight signal being representative of the instantaneous direction of flight of the aircraft; comparing said true course bearing signal and said direction-of-flight signal to generate an error signal representative of any angular difference between said true course bearing and said direction of flight; and controlling the flight direction of the aircraft in response to said error signal.

10. An automatic celestial, navigation and guidance system for aircraft comprising a present position computing means including a stellar reference platform being stabilized in space, a horizontal base, drive means referenced to said stellar platform and connected to said horizontal base for maintaining said base in a desired relation to the surface of the earth, a North-South and an East-West accelerometer mounted on said horizontal base and maintained oriented in latitude and longitude directions by said drive means to develop latitude and longitude acceleration signals, signal correcting means coupled to correct said acceleration signals to compensate for centrifugal and coriolis forces of the earth and the earth's shape, first integrator means coupled to said signal forming means for responding to said latitude and longitude acceleration signals to develop latitude and longitude velocity signals, second integrator means coupled to respond to said velocity signals to develop movements of shafts indicative of present latitude and longitude and for developing signals for controlling said drive means to control said horizontal base, settable means for generating destination latitude and longitude signals, navigation computing means coupled to said present position computing means for receiving said velocity signals and said shaft movements indicating distance and coupled to said settable means for generating first course signals representative of the direction of the true course bearing and distance to the destination position, an actual flight course generating means coupled to said present position computing means to generate second course signals corresponding to the actual flight of the aircraft, error signal generating means coupled to said navigation computing means and said actual flight course generating means to develop error signals representative of the deviation of the actual flight course from the true course, and means responsive to said error signal and coupled to the aircraft for guiding said aircraft to said destination position.

11. An automatic celestial navigation and guidance system for developing error signals to control an automatic pilot means, comprising a space stabilized platform, an automatic star tracking means mounted to said platform, an accelerometer platform, drive means coupled to said accelerometer platform and said space stabilized platform for maintaining said accelerometer platform in a horizontal position in response to signals received at an input, first and second accelerometers mounted on said accelerometer platform and responsive to accelerations of the aircraft in the North-South and East-West direction respectively to generate acceleration signals, North-South double integrator means coupled to be responsive to the North-South acceleration signals for developing a North-South velocity signal and a present latitude signal, East-West double integrator means coupled to respond to said East-West acceleration signals for developing an East-West velocity signal and a present longitude signal, feedback means coupled to said inputs of said drive means for applying said present latitude and present longitude signals to control said accelerometer platform so as to correct for the change in latitude and longitude of the aircraft, correction signal generator means responsive to said present latitude and present longitude signals and to said velocity signals for developing correction signals having characteristics indicative of the compensation for centrifugal forces and coriolis forces of the earth's motion and for the earth's spheroidal shape, signal combining means coupled between said accelerometers and said integrator means for combining said acceleration signals and said correction signals so that said present position signals accurately represent the present latitude and longitude, and navigation computer means coupled to respond to said present latitude and present-longitude signals and said velocity signals to develop error signals for guiding the aircraft to a destination.

12. An automatic celestial navigation and guidance system for aircraft, comprising a platform, servo mechanisms coupled to said platform for controlling the orientation of said platform about three orthogonal axes of rotation, one of said axes being perpendicular to the plane of the platform, two automatic star tracking devices mounted on said platform for producing signals representing the directions of preselected fixed celestial bodies, means coupled to said star tracking devices to provide control signals to said servo mechanisms for space stabilizing said platform in a fixed orientation with respect to said celestail bodies, an accelerometer platform, latitude-axis control means and longitude-axis control means coupled to said space stabilized platform and responsive to input signals to maintain said accelerometer platform in a horizontal position, first and second accelerometers mounted on said accelerometer platform and responsive to acceleration of the aircraft in the North-South and in the East-West direction to generate acceleration signals a first double integrator coupled to said North-South accelerometer for developing a North-South velocity signa and a present latitude signal, a second double integrato coupled to said East-West accelerometer for developin; an East-West velocity signal and a present longitude sig nal, means coupled to said latitude-axis control mean for applying said present latitude signals as input signal:

for controlling said accelerometer platform to rotate about said latitude axis through an angle corresponding to the change in latitude position of the aircraft during flight, means coupled to said longitude-axis control means for applying said present longitude signal as input signals for controlling said accelerometer platform to rotate about said longitude axis through an angle corresponding to the change in longitude position of the aircraft during flight, a correction signal generator coupled to both said double integrators and being responsive to said present latitude signal and present longitude signal and to said velocity signals to generate correction signals to compensate for the effects of centrifugal force and coriolis forces of the earth's motion and for the earth's spheroidal shape, means for adding said correction signals to said accelerometer signals so that the output signals developed by said double integrators accurately indicates the latitude and longitude of the present position of the aircraft, and computer means for utilizing said present-latitude signal, said present-longitude signal and said velocity signals to develop error signals and including means responsive to said error signals to guide said aircraft to a desired position.

13. Apparatus for computing the present position of an aircraft in earth's latitude and longitude coordinates comprising a platform, servo mechanisms coupled to said platform for controlling the orientation of said platform about three orthogonal axes of rotation, one of said axes being perpendicular to the plane of the platform, two automatic star tracking devices mounted on said platform for producing signals representing the directions of preselected fixed celestial bodies, gyro mechanisms fixedly mounted on said platform and coupled to said servo mechanisms being responsive to said star tracking device to provide control signals for space stabilizing said platform in a fixed orientation with respect to said celestial bodies, an accelerometer platform, latitude-axis control means and longitude-axis control means coupled to said accelerometer platform and to said space stabilized platform for maintaining said accelerometer platform in a horizontal position, first and second accelerometers mounted on said accelerometer platform and responsive to acceleration of the aircraft to generate North-South and nals including a spherical trigonometric course computer for generating a first course signal, a plane trigonometric course computer for generating a second course signal, a dead reckoning course computer for generating a third course signal, and a sequence switching means connected between each of said course computers and said guidance means and responsive to a predetermined value of each of said course signals to switch said first, said second, and said third course signals in sequence to said guidance means for directing the aircraft to the destination position, an arrival signalling circuit connected between said navigation computer and said guidance means and responsive to said sequence switching means for developing desired course signals when the destination position is reached and guidance means connected and responsive to said navigation computer for controlling the flight of an aircraft.

15. In an automatic navigation system, a present position signal generator referenced against the positions of fixed celestial bodies to develop longitude and latitude velocity signals and longitude and latitude position signals, a first destination signal generator for developing longitude destination signals for comparing with said position signals to indicate destination, a second destination signal generator for developing latitude destination signals, a navigation computer connected with all of said signal generators to develop first and second desired course signals from said velocity and position signals, guidance means connected to be responsive to said desired course signals of said navigation computer, and an arrival signalling circuit connected between said guidance means and said navigation computer and including a cam and means responsive for comparing said second desired course signal and said destination signals to rotate said cam, said cam having a detent section and means for controlling a switch to indicate destination when said second course signal equals said destination signal.

16. In an automatic navigational system as set forth in claim 15, the navigation computer defined therein including switching means coupled to said first and second destination signal generators and responsive thereto, and to said navigation computer whereby when said first first and second integrators for developing second integrated East-West and North-South signals indicative of distance of movement of said craft, and coupled for controlling said first and second means, said deviation compensator and said drive means, first and second integrated East-West and North-South signals coupled for controlling said pilot system.

18. An automatic celestial navigation and guidance system for a craft developing latitude, longitude, East-West velocity and North-South velocity signals for controlling an indicator means, comprising a stellar referenced platform being stabilized in space, a horizontal base, drive means referenced to said stellar platform and connected to said horizontal base for maintaining said base oriented parallel to the surface of the earth, an East-West and a North-South accelerometer mounted on said horizontal base for developing accelerometer signals indicative of the acceleration in the respective direction, a first and a second integrator coupled to said first and second adders for developing first integrated East-West and North-South signals indicative of velocity of said craft, a third and a fourth integrator coupled to said respective first and second integrators for developing second integrated East-West and North-South signals indicative of distance of movement of said craft, and coupled to said indicator means for indicating present position of said craft, a first and a second multiplier coupled to receive said signals from said East-West and North-South accelerometers respectively and for correcting said signals, first and second means coupled to develop an ellipticity correction signal in response to said respective second integrated East-West and North-South signals and coupled to control said multipliers, a first and a second adder coupled to said first and second multiplier for developing corrected signals from the accelerometer signals received from said multiplier, a deviation compensator for developing a compensating signal to correct for earth rotation in response to said first and second integrated East-West and North-South signals and coupled to control said first and second adders.

References Cited in the file of this patent
UNITED STATES PATENTS

| | | |
|---|---|---|
| 2,109,283 | Boykow | Feb. 22, 1938 |
| 2,444,933 | Jasperson | July 13, 1948 |
| 2,492,148 | Herbold | Dec. 27, 1949 |
| 2,613,071 | Hansel | Oct. 7, 1952 |
| 2,688,440 | Gray et al. | Sept. 7, 1954 |
| 2,762,123 | Schultz et al. | Sept. 11, 1956 |